(12) United States Patent
McIntosh

(10) Patent No.: US 10,898,036 B2
(45) Date of Patent: Jan. 26, 2021

(54) HANDS FREE PAPER TOWEL DISPENSERS FOR AIRCRAFT ENVIRONMENTS AND METHODS FOR OPERATING THE SAME

(71) Applicant: The Boeing Company, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 179 days.

(21) Appl. No.: 16/173,312

(22) Filed: Oct. 29, 2018

(65) Prior Publication Data
US 2020/0129015 A1 Apr. 30, 2020

(51) Int. Cl.
*A47K 10/38* (2006.01)
*B64D 11/02* (2006.01)
*A47K 10/36* (2006.01)
*A47K 10/32* (2006.01)

(52) U.S. Cl.
CPC ............ *A47K 10/38* (2013.01); *B64D 11/02* (2013.01); *A47K 2010/3233* (2013.01); *A47K 2010/3253* (2013.01); *A47K 2010/3668* (2013.01)

(58) Field of Classification Search
CPC .. A47K 10/38; A47K 10/46; A47K 2010/365; A47K 2010/3668; A47K 2010/3253; A47K 2010/3233; A47K 10/3637; A47K 10/3687; B64D 11/02
See application file for complete search history.

(56) References Cited

U.S. PATENT DOCUMENTS

| | | | | |
|---|---|---|---|---|
| 4,408,811 A * | 10/1983 | Richardson | ............ | A47K 10/24 312/138.1 |
| 7,523,885 B2 * | 4/2009 | Lewis | ..................... | A47K 10/36 242/563 |
| 7,841,556 B2 * | 11/2010 | Elliott | ................ | A47K 10/3687 242/564.2 |
| 8,408,487 B2 | 4/2013 | Rodrian et al. | | |
| 9,572,460 B2 * | 2/2017 | Petocchi | ............ | A47K 10/3612 |
| 9,944,481 B2 | 4/2018 | Green | | |
| 2007/0007417 A1 | 1/2007 | Brandenburg | | |

(Continued)

OTHER PUBLICATIONS

U.S. Appl. No. 16/168,076, filed Oct. 23, 2018, Mcintosh.

*Primary Examiner* — William A. Rivera
(74) *Attorney, Agent, or Firm* — Dascenzo Gates Intellectual Property Law, P.C.

(57) ABSTRACT

Aircraft, aircraft paper towel dispensers, and methods for operating aircraft paper towel dispensers are disclosed. An aircraft paper towel dispenser includes a cabinet housing that defines an inner volume and a housing aperture that is configured to allow a portion of paper towel to be dispensed outside of the cabinet housing. The cabinet housing also includes a vanity cover configured to transition between an open state in which the inner volume is accessible, and a closed state in which the inner volume is not accessible. The aircraft paper towel dispenser comprises each of a paper towel holder within the inner volume and configured to secure a supply of paper towel, and a drive mechanism positioned within the inner volume and configured to cause the portion of the paper towel to be dispensed from the inner volume to a region outside of the cabinet housing via the housing aperture.

20 Claims, 9 Drawing Sheets

(56) References Cited

U.S. PATENT DOCUMENTS

| | | | |
|---|---|---|---|
| 2012/0031922 A1* | 2/2012 | Johnson | A47K 5/1217 |
| | | | 222/23 |
| 2015/0090832 A1* | 4/2015 | Case | B65H 16/005 |
| | | | 242/562 |
| 2015/0307193 A1* | 10/2015 | Savian | B64D 11/02 |
| | | | 244/118.5 |
| 2018/0132676 A1 | 5/2018 | Thomas et al. | |

* cited by examiner ns free paper towel dispenser where the vanity cover is in a closed state.
HANDS FREE PAPER TOWEL DISPENSERS FOR AIRCRAFT ENVIRONMENTS AND METHODS FOR OPERATING THE SAME

FIELD

The present disclosure relates to paper towel dispensers for aircraft environments.

BACKGROUND

Because aircraft have a limited volume that can be used for storage capacity, airlines strive to maximize the utility of aircraft lavatories and storage spaces. Additionally, since additional aircraft weight corresponds to increased fuel costs, there is a strong desire for airlines to reduce the amount of supplies that need to be brought on flights. This is especially true for reserve supplies for airplane lavatories, such as paper towels. While it is necessary that aircraft do not run out of paper towels, reserve paper towel rolls take up valuable storage space and add increased weight to the aircraft during flight. Moreover, once used, used paper towels must still be transported via waste receptacles. Therefore, it is desired to have a system that reduces the spatial footprint of paper towel dispensers in aircraft lavatories, the amount of reserve paper towels that need to be transported on aircraft flights, and the amount of waste paper towels created during aircraft lavatory usage.

SUMMARY

Transportation systems (e.g., aircrafts, trains, maritime vessels, recreational vehicles, automobiles, etc.), paper towel dispensers, and methods for operating a transportation system paper towel dispenser are disclosed. A transportation system includes a cabinet housing that defines an inner volume and a housing aperture, wherein the aperture is configured to allow a portion of paper towel to be dispensed from the inner volume to a region outside of the cabinet housing. The cabinet housing also includes a vanity cover configured to selectively transition between an open state in which the inner volume is accessible, and a closed state in which the inner volume is not accessible. Additionally, the transportation system comprises each of a paper towel holder within the inner volume and configured to securely retain a supply of paper towel, and a drive mechanism positioned within the inner volume and configured to cause the portion of the paper towel to be dispensed from the inner volume to a region outside of the cabinet housing via the housing aperture.

A method for operating a transportation system paper towel dispenser includes determining, by a microprocessor of the transportation system, status information indicative of a status of the transportation system paper towel dispenser, wherein the status of the transportation system paper towel dispenser comprises one of a paper towel jam, a malfunction of the drive mechanism, a usage of the transportation system paper towel dispenser, an amount of paper towel dispensed, and an amount of paper towel remaining in the inner volume; and then subsequently transmitting notification data indicating the status information to a computing device external to the transportation system.

DESCRIPTION

Figure 1:
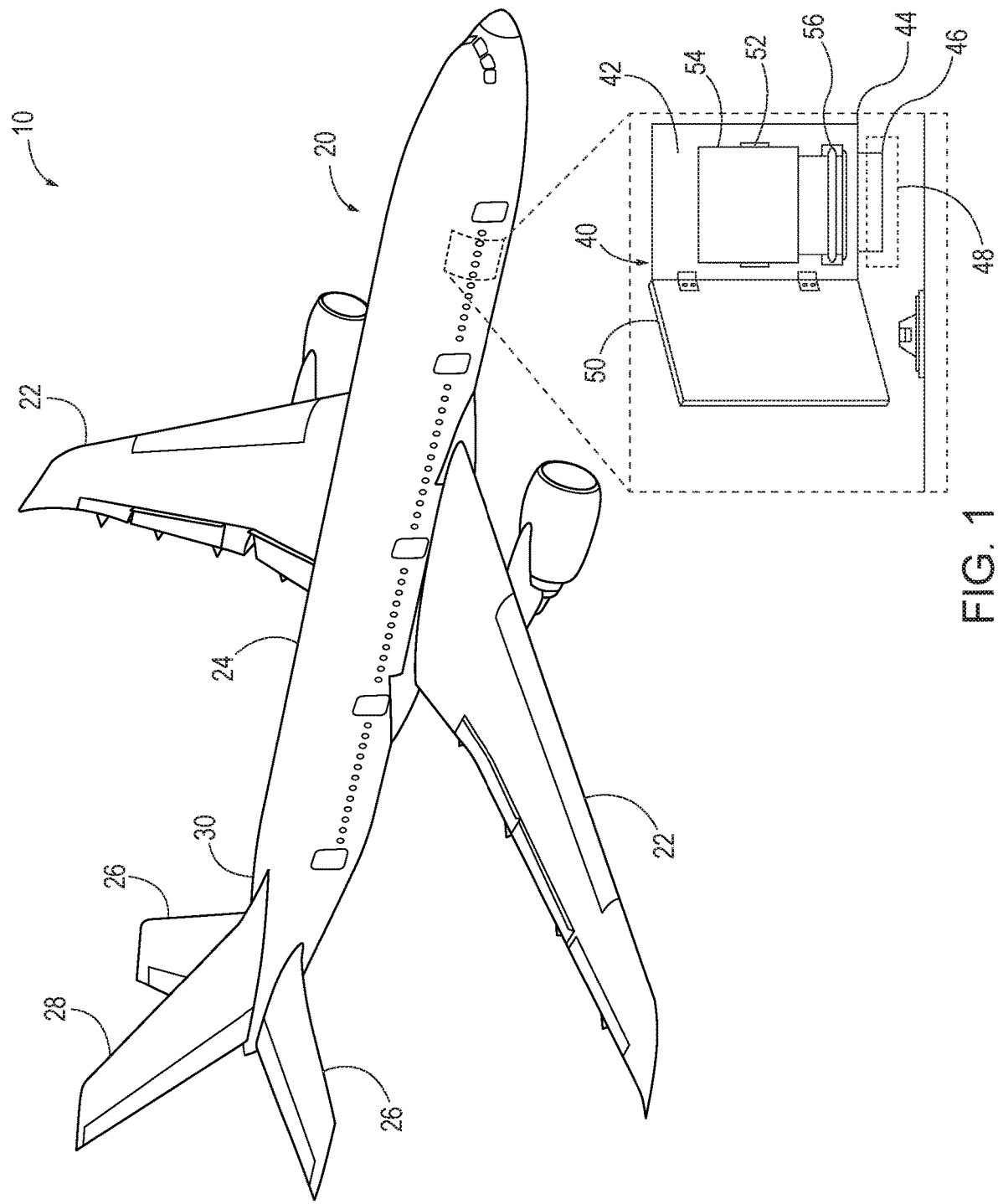
FIG. 1 is a perspective view of an example aircraft that includes a hands free paper towel dispenser according to the present disclosure.

FIGS. 1-10 provide illustrative, non-exclusive examples of hands free paper towel dispensers 100 for transportation system environments according to the present disclosure, and/or of methods of utilizing hands free paper towel dispensers 100 for transportation system environments. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

In general, elements that are likely to be included in a given (i.e., a particular) embodiment and/or method are illustrated in solid lines, while elements that are optional to a given embodiment and/or method are illustrated in dashed lines. However, elements that are shown in solid lines are not essential to all embodiments, and an element shown in solid lines may be omitted from a given embodiment without departing from the scope of the present disclosure.

FIG. 1 is a schematic representation of an illustrative, non-exclusive example of a transportation system 10, such as an aircraft 20, that may be utilized with and/or include the systems and methods according to the present disclosure. Alternatively, transportation system 10 may correspond to a train, maritime vessel, recreational vehicle, automobile, etc. Aircraft 20 includes wings 22 that are attached to a fuselage 24. Aircraft 20 also may include horizontal stabilizers 26 and a vertical stabilizer 28 that are attached to a tail 30.

Aircraft 20 further includes a cabinet housing 40. Cabinet housing 40 defines an inner volume 42 and a housing aperture 44 that is configured to allow a portion 46 of paper towel to be dispensed from the inner volume 42 to a region 48 outside of the cabinet housing 40. In some embodiments, the cabinet housing 40 may be located within a lavatory of the aircraft 20. Alternatively, the cabinet housing 40 may be located within a different location of the aircraft 20, such as a kitchen, or galley area, an egress area, crew rest area, or another location where access to paper towels is desired. The cabinet housing 40 also includes a vanity cover 50 configured to selectively transition between an open state in which the inner volume 42 is accessible, and a closed state in which the inner volume 42 is not accessible. In FIG. 1, the vanity cover 50 is illustrated as being in an open state. Additionally, the aircraft 20 comprises each of a paper towel holder 52 within the inner volume 42 and configured to securely retain a supply 54 of paper towel, and a drive mechanism 56 positioned within the inner volume 42 and configured to cause the portion 46 of paper towel to be dispensed from the inner volume 42 to the region 48 outside of the cabinet housing 40 via the housing aperture 44.

Figure 2:
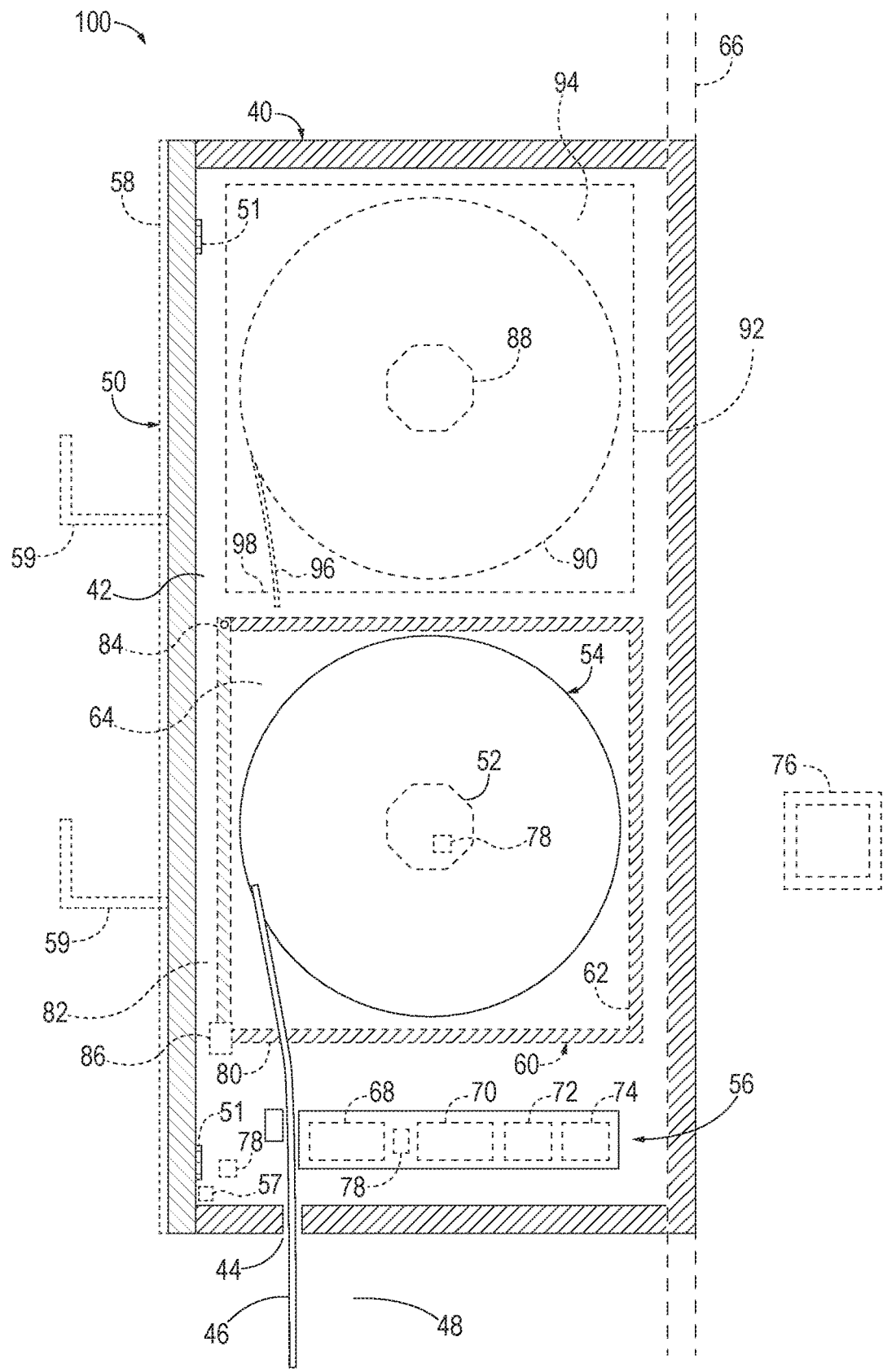
FIG. 2 is schematic diagram representing a hands free paper towel dispenser according to the present disclosure.

FIG. 2 is a schematic representation of illustrative, non-exclusive examples of a hands free paper towel dispensers 100 for transportation system environments according to the present disclosure. Hands free paper towel dispensers 100 for aircraft environments may be located within a transportation system 10, such as an aircraft 20, and are configured to dispense portions of paper towels 46.

As schematically illustrated in FIG. 2, hands free paper towel dispensers 100 for transportation system environments include at least the cabinet housing 40, the paper towel holder 52, and the drive mechanism 56. Additionally, as illustrated in FIG. 2, the hands free paper towel dispensers 100 for transportation system environments optionally may include a suppression casing 60 positioned within the inner volume 42. The suppression casing 60 comprises a suppression wall 62 defining an enclosed storage volume 64. As shown in FIG. 2, the paper towel holder 52 is positioned within the enclosed storage volume 64. The suppression wall 62 further defines a suppression aperture 80 configured to allow the portion 46 of paper towel to be dispensed from within the enclosed storage volume 64 to the drive mechanism 56. As illustrated in FIG. 2, the drive mechanism 56 is located outside of the suppression casing 60.

The cabinet housing 40 defines an inner volume 42 and a housing aperture 44. The cabinet housing 40 may be composed of a composite material, such as one or more composite sandwich panels. In some embodiments, the cabinet housing 40 may include an EMI shield to protect electromagnetic signals from being transmitting into or out of the inner volume 42. The housing aperture 44 may be defined by the cabinet housing 40 to have a shape that allows the portion 46 of paper towel to pass from the inner volume 42 to the region 48 outside of the cabinet housing 40 via the housing aperture 44. When in the region 48 outside of the cabinet housing 40, the portion 46 of paper towel is exposed so as to allow a transportation system passenger to grip and remove the portion 46 of paper towel.

The cabinet housing 40 is a component portion of an transportation system 10, and may be located within a different location of the transportation system 10, such as a kitchen, or galley area, a lavatory, an egress area, crew rest area, or another location where access to paper towels is desired. For example, the cabinet housing 40 may be part of the cabinetry for an airplane kitchen area. In some embodiments, the cabinet housing 40 may be part of the interior structure of the transportation system 10, and/or be operatively attached to a frame 66 of the transportation system 10. For example, the cabinet housing 40 may be a portion of a wall of the interior of the transportation system 10.

The cabinet housing 40 also includes a vanity cover 50. The vanity cover 50 is mechanically coupled to a portion of the cabinet housing 40 via one or more vanity attachment mechanisms 51. The vanity attachment mechanisms 51 are configured to allow the vanity cover 50 to be selectively translated between one or more open states in which the inner volume 42 is accessible, and a closed state in which the inner volume 42 is not accessible. In FIG. 2, the vanity cover 50 is illustrated as being in a closed state. In some embodiments, the cabinet housing 40 also includes one or more vanity latch mechanisms 57 that are configured to selectively retain the vanity cover 50. The vanity latch mechanisms 57 may be able to switch between a locked state in which the vanity latch mechanisms 57 restrict the vanity cover 50 from transitioning between a closed state and an open state, and an unlocked state in which the vanity cover 50 is able to freely transition between the open state and the closed state. In some embodiments, the vanity cover 50 may include a mirrored surface 58 opposite the inner volume 42. For example, the mirrored surface 58 may correspond to, or be part of, a mirror within a transportation system lavatory. Alternatively, or in addition, the vanity cover 50 may include one or more shelves 59 configured to store items.

The paper towel holder 52 is located within the inner volume 42 and is configured to securely retain a supply 54 of paper towel during operation of the hands free paper towel dispenser 100 for transportation system environments. One or more of the paper towel holder 52, the suppression casing 60, the vanity cover 50, and/or the vanity latch mechanism 57, are designed to retain items of mass within the hands free paper towel dispenser 100, either as individual components, or operating in unison to comply with stringent dynamic structural requirements specifically and uniquely for aircraft environments (e.g., FAA certification requirements). The paper towel holder 52 may allow the paper towel roll to rotate so as to enable the portion 46 of paper towel to be fed from the paper towel roll to the drive mechanism 56. In some embodiments, the paper towel holder 52 allows the supply 54 of paper towel to rotate in response to a tension on the portion 46 of paper towels. For example, where the supply 54 of paper towel corresponds to a paper towel roll, the paper towel holder 52 may include a structural component extending inwardly into the inner volume 42 and configured to extend into the paper towel roll.

The drive mechanism 56 is positioned within the inner volume 42 and configured to cause the portion 46 of paper towel to be dispensed from the inner volume 42 to the region 48 outside of the cabinet housing 40 via the housing aperture 44. The drive mechanism 56 may be partially or completely composed of a low flammability material. For example, the drive mechanism 56 may be composed of materials that comply with stringent flammability requirements specifically and uniquely for aircraft environments (e.g., FAA certification requirements). In some embodiments, the drive mechanism 56 may be actuated by a passenger of the transportation system 10. Alternatively, the drive mechanism 56 may automatically dispense the portion 46 of paper towel. For example, the drive mechanism 56 may include a motor 68 that is configured to drive the operation of the drive mechanism 56, and a power source 70 to drive the motor 68. In various embodiments, the power source 70 may include a battery, or a connection to the electrical system of the transportation system 10. In some embodiments, the hands free paper towel dispenser 100 may further comprises a backup hand crack that is configured to allow paper towel to be manually dispensed from the hands free paper towel dispenser 100 in the event of a failure of the drive mechanism 56.

As illustrated in FIG. 2, the drive mechanism 56 optionally includes a microprocessor 72. In some embodiments, the microprocessor 72 is configured to determine status information indicative of a status of the hands free paper towel dispenser 100 for transportation system environments. Example statuses may include: operational; in use; malfunctioning; running low on paper towels; out of paper towels; paper jam, low on battery power; out of battery power; etc. In some embodiments, the drive mechanism 56 further includes a transmitter 74 configured to transmit data describing the status of the hands free paper towel dispenser 100 to a computing device 76 external to the hands free paper towel dispenser 100. The transmitter 74 may be a wireless transmitter, or may be a wired interface configured to transmit the data via a physical connection. The computing device 76 may be located on the transportation system 10, or may be a ground based system located external to the transportation system 10 that receives the data from the transmitter 74. Where the computing device 76 is located external to the transportation system 10, the signal transmitted by the transmitter 74 may be relayed by an intermediary device over a larger network, such as the internet.

In some embodiments, the hands free paper towel dispenser 100 further includes one or more sensors 78 configured to detect sensor information relating to the status of the hands free paper towel dispenser 100. Example sensor information may correspond to a detection of: a paper towel jam; a malfunction of the drive mechanism 56; a usage of the hands free paper towel dispenser 100; an amount of the paper towel dispensed; and an amount of the paper towel remaining in the inner volume 42, etc. The one or more sensors 78 may be located at multiple locations within the hands free paper towel dispenser 100. For example, individual sensors 78 may be operationally coupled to and/or incorporated within the cabinet housing 40, inner volume 42, paper towel holder 52, drive mechanism 56, or component elements thereof. Individual sensors 78 of the one or more sensors 78 may correspond to capacitance sensors, optical sensors, mechanical sensors, ultrasonic sensors, infrared sensors, touch sensors, proximity sensors, pressure sensors, microphones, voltage sensors, tension sensors, piezoelectric sensors, linear encoders, rotary encoders, etc. The microprocessor 72 may determine the status information based on the sensor information of the hands free paper towel dispenser 100 detected by the one or more sensors 78, and/or that an operational fault (e.g., a low battery, a low paper towel level, paper jam, and being inoperative, etc.) of the hands free paper towel dispenser 100 has occurred based on the status information. Alternatively or in addition, the microprocessor 72 may determine that the hands free paper towel dispenser 100 has been tampered with based on the sensor information.

In some embodiments, in response to the microprocessor 72 determining that an operational fault has occurred, the microprocessor 72 may cause the transmitter 74 to transmit a notification to the computing device 76 that the operational fault has occurred. Additionally, if the microprocessor 72 determines that no action is taken after the transmission of the notification or that a predetermined time period has passed without an action being taken to address the operational fault, the microprocessor 72 may cause the transmitter 74 to transmit an additional notification to another computing device 76 that the operational fault has occurred. Moreover, if the microprocessor 72 determines that an action taken to repair the operating fault does not repair the operational fault, the microprocessor 72 may cause the transmitter 74 to transmit an additional notification to indicate that the operational fault is still present.

In some embodiments, at least one of the one or more sensors 78 is configured to detect the presence of an object (e.g., a passenger, a hand of a passenger, etc.) proximate to the hands free paper towel dispenser 100, and the drive mechanism 56 is configured to dispense the portion 46 of paper towel in response to a detection of the presence of the object. Alternatively, or in addition, the hands free paper towel dispenser 100 may comprise a sensor that is configured to detect that the portion 46 of paper towel has been removed, and the drive mechanism 56 is configured to dispense an additional portion 46 of paper towel after a predetermined period of time has passed after the portion 46 of paper towel is removed.

As illustrated in FIG. 2, the hands free paper towel dispenser 100 may optionally include a suppression casing 60 positioned within the inner volume 42. The suppression casing 60 comprises a suppression wall 62 that defines an enclosed storage volume 64. The suppression casing 60 may be partially or completely composed of a low flammability material. For example, the suppression casing 60 may be composed of materials that comply with stringent flammability requirements specifically and uniquely for aircraft environments (e.g., FAA certification requirements). In various embodiments, the suppression casing 60 may be mechanically coupled to the cabinet housing 40, or a frame 66 of the transportation system 10. For example, the suppression casing 60 may be directly coupled to the frame 66 of a wall of the lavatory of the transportation system 10. Additionally, in embodiments where the hands free paper towel dispenser 100 includes the suppression casing 60, the paper towel holder 52 is operationally coupled to the suppression wall 62 and within the enclosed storage volume 64, while the drive mechanism 56 is located outside of the suppression casing 60. The suppression casing 60 is configured to secure the supply 54 of paper towel during an event where the hands free paper towel dispenser 100, and/or the transportation system 10 itself, is jostled, retaining these items of mass to comply with stringent dynamic structural requirements specifically and uniquely for aircraft environments (e.g., FAA certification requirements).

The suppression wall 62 defines a suppression aperture 80 that is configured to allow the portion 46 of paper towel to be dispensed from within the supply 54 of paper towel within the enclosed storage volume 64 to the drive mechanism 56. In some embodiments, the suppression wall 62 is configured to limit the flow of air into the enclosed storage volume 64. For example, the suppression wall 62 may be configured so that air is only allowed into the enclosed storage volume 64 via the suppression aperture 80. In some embodiments, the suppression aperture 80 is shaped to allow the portion 46 of paper towel to be dispensed from within the enclosed storage volume 64 while limiting the flow of air into the enclosed storage volume 64. Alternatively or in addition, one or more sealing components may extend from the suppression wall 62 so as to restrict airflow between the enclosed storage volume 64 and the inner volume 42. For example, a malleable material may extend from the suppression wall 62 and proximate to the portion 46 of paper towel as the portion 46 of paper towel passes through the suppression aperture 80. In this way, the suppression aperture 80 and/or the suppression wall 62 are configured to limit the flow of air into the enclosed storage volume 64 such that the airflow is insufficient to sustain a flame within the enclosed storage volume 64. Because of this, any portion 46 of paper towel that is ignited will be extinguished within the enclosed storage volume 64 due to lack of oxygen.

The suppression casing 60 may include an access door 82 that is mechanically coupled to a portion of the suppression casing 60 via one or more suppression attachment mechanisms 84. The suppression attachment mechanisms 84 are configured to allow the access door 82 to be selectively translated between one or more open states in which the supply 54 of paper towel can be refilled or removed from the paper towel holder 52, and a closed state in which the supply 54 of paper towel is secured within the enclosed storage volume 64. In FIG. 2, the access door 82 is illustrated as being in a closed state. In some embodiments, the cabinet housing 40 also includes one or more suppression latch mechanisms 86 that are configured to selectively retain the access door 82. The suppression latch mechanisms 86 may be able to switch between a locked state in which the suppression latch mechanisms 86 restrict the access door 82 from transitioning between a closed state and an open state, and an unlocked state in which the access door 82 is able to freely transition between the open state and the closed state.

In some embodiments, the hands free paper towel dispenser 100 may include one or more additional paper towel holders 88 that are each configured to securely retain an additional supply 90 of paper towel. The additional paper towel holders 88 may be located within the inner volume 42 or the enclosed storage volume 64 and mechanically coupled to one of the cabinet housing 40 and/or the suppression casing 60. Additionally, in embodiments where the hands free paper towel dispenser 100 includes an additional suppression casing 92 that defines an additional enclosed storage volume 94, an additional paper towel holder 88 may be located within the additional enclosed storage volume 94 and mechanically coupled to the additional suppression casing 92 such that an additional portion 96 of paper towel can be dispensed from within the additional enclosed storage volume 94 to the drive mechanism 56 via an additional suppression aperture 98. Suppression casing 60 and additional suppression casing 92 may be separate enclosures. Alternatively, suppression casing 60 and additional suppression casing 92 may be combined into a single enclosure, or may not be included at all.

Turning now to FIGS. 3-7, illustrative non-exclusive examples of hands free paper towel dispensers 100 for transportation system environments are illustrated. Where appropriate, the reference numerals from the schematic illustrations of FIGS. 1-2 are used to designate corresponding parts of the examples of FIGS. 3-7; however, the examples of FIGS. 3-7 are non-exclusive and do not limit hands free paper towel dispensers 100 for transportation system environments to the illustrated embodiments of FIGS. 3-7. That is, hands free paper towel dispensers 100 for transportation system environments are not limited to the specific embodiments of FIGS. 3-7, and hands free paper towel dispensers 100 for transportation system environments may incorporate any number of the various aspects, configurations, characteristics, properties, etc. of hands free paper towel dispensers 100 for transportation system environments that are illustrated in and discussed with reference to the schematic representations of FIGS. 1-2 and/or the embodiments of FIGS. 3-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 3-7; however, it is within the scope of the present disclosure that the previously discussed features, variants, etc. may be utilized with the examples of FIGS. 3-7.

Figure 3:
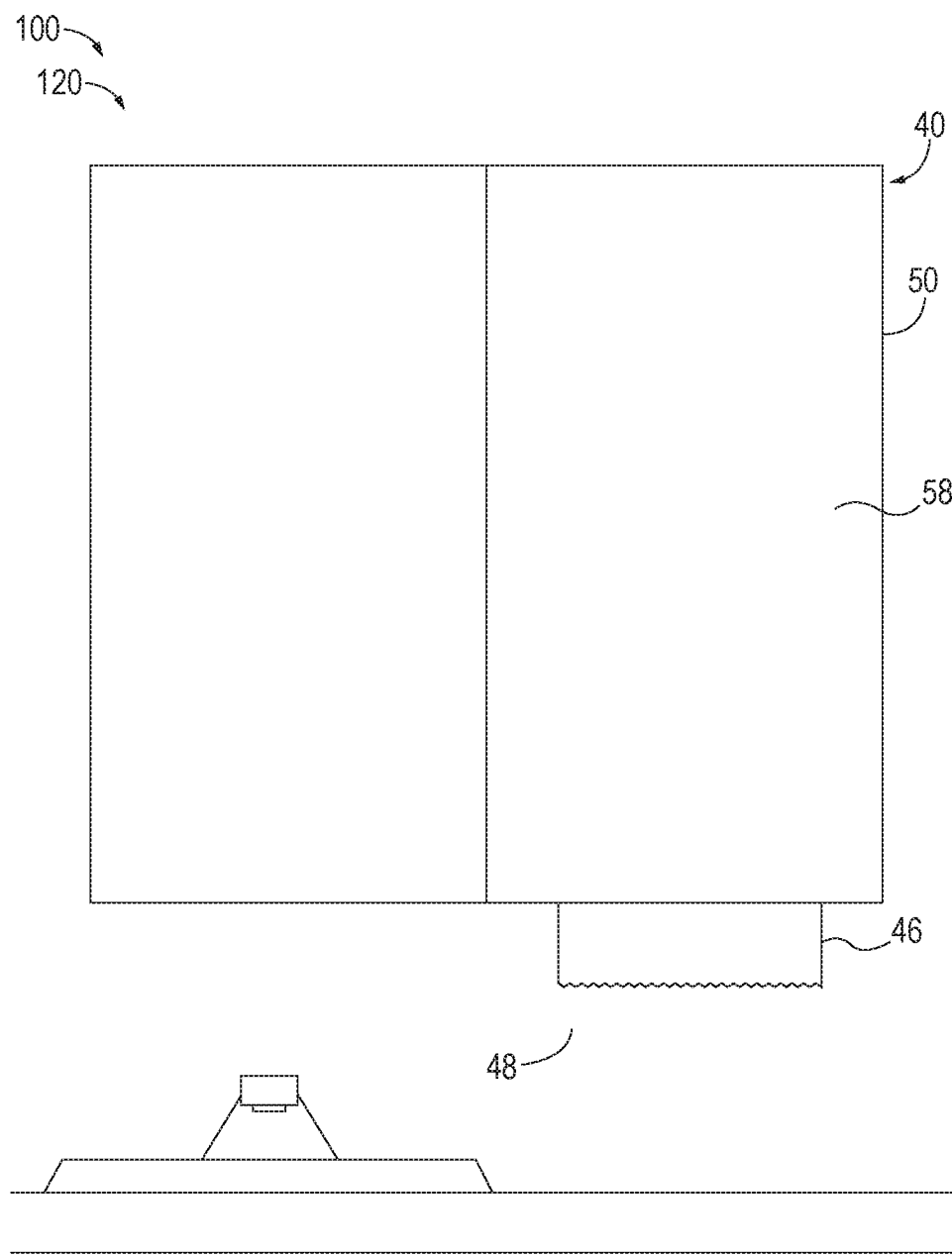
FIG. 3 is an example transportation system lavatory that includes a hands free paper towel dispenser where the vanity cover is in a closed state.
Figure 4:
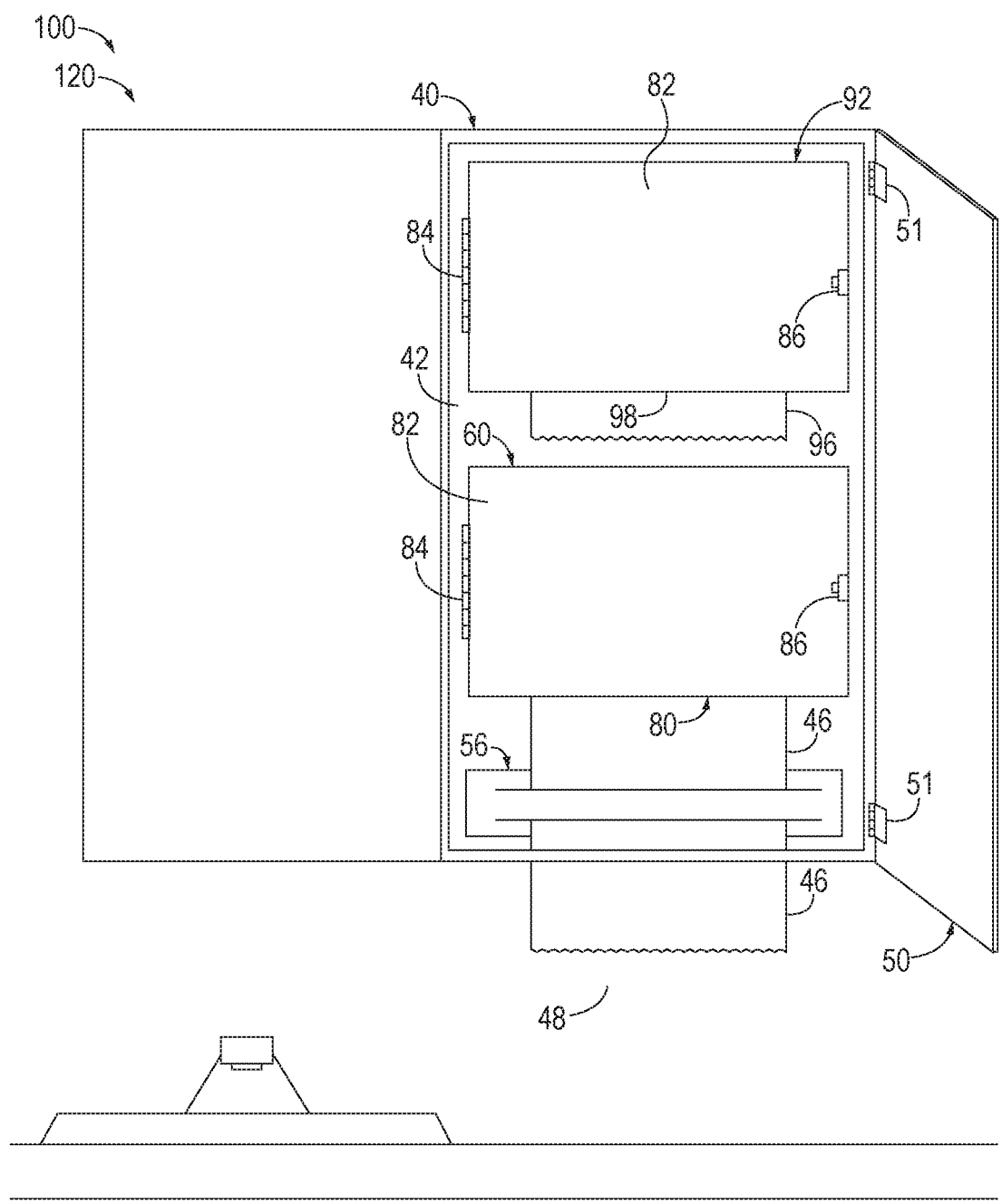
FIG. 4 is an example transportation system lavatory that includes a hands free paper towel dispenser where the vanity cover is in an open state and the suppression casing is in a closed state.
Figure 5:
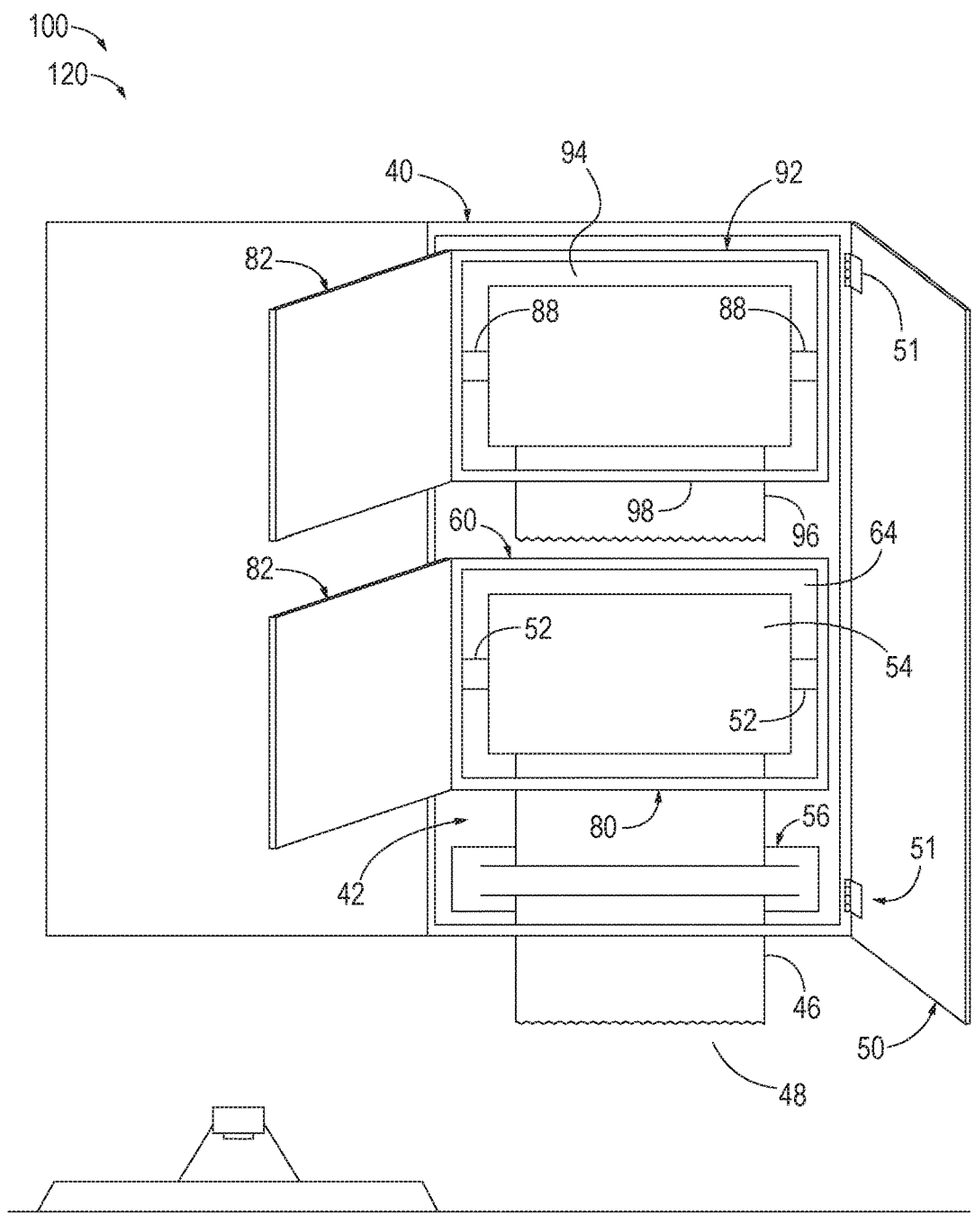
FIG. 5 is an example transportation system lavatory that includes a hands free paper towel dispenser where the vanity cover and the suppression casing are in an open state.

As seen in FIGS. 3-5, a hands free paper towel dispenser 120 is an example of a hands free paper towel dispenser 100 for a transportation system environment that is incorporated into an aircraft lavatory. FIG. 3 illustrates an example of an aircraft lavatory interior that includes hands free paper towel dispenser 120 where vanity cover 50 is in a closed state. Hands free paper towel dispenser 120 includes a cabinet housing 40 that defines an inner volume 42 (not pictured in FIG. 3) and a housing aperture 44 (not pictured in FIG. 3). The housing aperture 44 is configured to allow a portion 46 of paper towel to be dispensed from the inner volume 42 to a region 48 outside of the cabinet housing 40. Hands free paper towel dispenser 120 further includes a vanity cover 50. In FIG. 3, the vanity cover 50 is illustrated as being in a closed state where the vanity cover 50 obscures the view of a paper towel holder 52, a supply 54 of paper towel, a drive mechanism 56, the inner volume 42, and other components within the inner volume 42. The vanity cover 50 comprises a mirrored surface 58. This both allows aircraft passengers to use the vanity cover 50 as a mirror, and optically increases the perceived size of the aircraft lavatory.

FIG. 4 illustrates an example aircraft lavatory that includes hands free paper towel dispenser 120 where vanity cover 50 is in an open state and suppression casing 60 is in a closed state. Hands free paper towel dispenser 120 includes a cabinet housing 40 that defines an inner volume 42, and a housing aperture 44 (not pictured in FIG. 4) that is configured to allow a portion 46 of paper towel to be dispensed from the inner volume 42 to a region 48 outside of the cabinet housing 40. Hands free paper towel dispenser 120 further includes a vanity cover 50. In FIG. 4, the vanity cover 50 is illustrated as being in an open state.

As illustrated in FIG. 4, a suppression casing 60, an additional suppression casing 92, and a drive mechanism 56 are located within the inner volume 42. Each of the suppression casing 60 and the additional suppression casing 92 define a suppression aperture 80 and an additional suppression aperture 98, respectively. Each of the suppression aperture 80 and the additional suppression aperture 98 are configured to allow a portion 46 of paper towel and an additional portion 96 of paper towel, respectively, to be dispensed from an enclosed storage volume 64 (not pictured in FIG. 4) and an additional enclosed storage volume 94 (not pictured in FIG. 4) to the drive mechanism 56. The drive mechanism 56 is configured to cause the portion 46 of paper towel and/or the additional portion 96 of paper towel to be dispensed from the inner volume 42 to a region 48 outside of a cabinet housing 40 via the housing aperture 44 (not pictured in FIG. 4). While FIG. 4 shows suppression casing 60 and additional suppression casing 92 as separate enclosures, these could be combined into a single enclosure, or may not be included at all.

Each of the suppression casing 60 and the additional suppression casing 92 include an access door 82 that is attached to a portion of the suppression casing 60 and the additional suppression casing 92 via a suppression attachment mechanism 84. The suppression attachment mechanisms 84 are configured to allow the access doors 82 to be selectively translated between one or more open states in which a supply 54 of paper towel (not pictured in FIG. 4) can be refilled or removed from the paper towel holder 52 (not pictured in FIG. 4), and a closed state in which the supply 54 of paper towel is secured within the suppression casing 60. In FIG. 4, the access door 82 is illustrated as being in a closed state. The suppression casing 60 also includes one or more suppression latch mechanisms 86 that are configured to selectively retain the access door 82 in the closed state.

FIG. 5 illustrates an example aircraft lavatory that includes hands free paper towel dispenser 120 where vanity cover and suppression casing 60 are in an open state. Hands free paper towel dispenser 120 includes a cabinet housing 40 that defines an inner volume 42, and a housing aperture 44 (not pictured in FIG. 5) that is configured to allow a portion 46 of paper towel to be dispensed from the inner volume 42 to a region 48 outside of the cabinet housing 40. Hands free paper towel dispenser 120 further includes a vanity cover 50. In FIG. 5, the vanity cover 50 is illustrated as being in an open state.

As illustrated in FIG. 5, a suppression casing 60, an additional suppression casing 92, and a drive mechanism 56 are located within the inner volume 42. Each of the suppression casing 60 and the additional suppression casing 92 define a suppression aperture 80 and an additional suppression aperture 98, respectively. Each of the suppression aperture 80 and the additional suppression aperture 98 are configured to allow a portion 46 of paper towel and an additional portion 96 of paper towel, respectively, to be dispensed from an enclosed storage volume 64 and an additional enclosed storage volume 94 to the drive mechanism 56. The drive mechanism 56 is configured to cause the portion 46 of paper towel and/or the additional portion 96 of paper towel to be dispensed from the inner volume 42 to a region 48 outside of the cabinet housing 40 via the housing aperture 44 (not pictured in FIG. 5).

Each of the suppression casing 60 and the additional suppression casing 92 include an access door 82 that is attached to a portion of the suppression casing 60 and the additional suppression casing 92 via a suppression attachment mechanism 84 (not pictured in FIG. 5). The suppression attachment mechanisms 84 are configured to allow the access doors 82 to be selectively translated between one or more open states in which a supply 54 of paper towel can be refilled or removed from a paper towel holder 52, and a closed state in which the supply 54 of paper towel is secured within the suppression casing 60. In FIG. 5, the access door 82 is illustrated as being in an open state.

Figure 6:
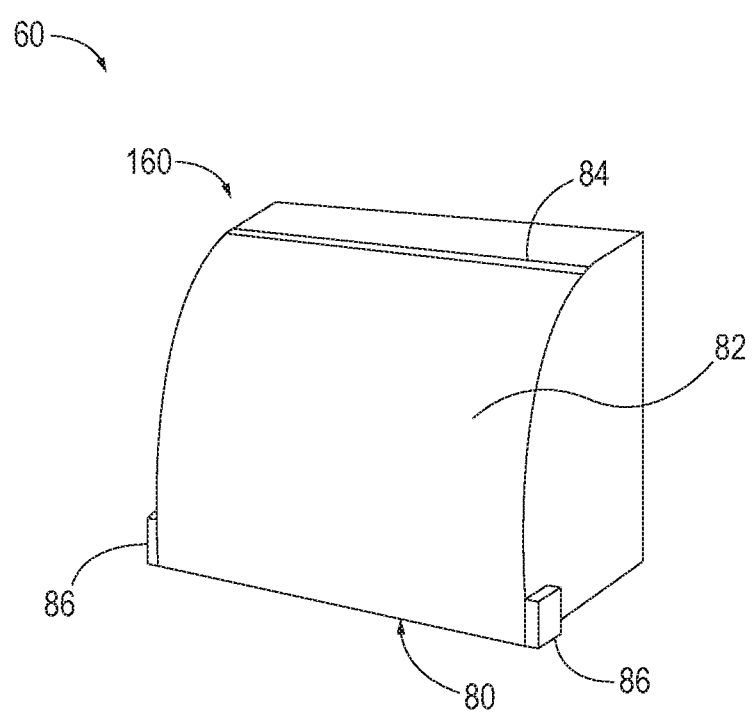
FIG. 6 is an example suppression casing according to the present disclosure, where the suppression casing is in a closed state.
Figure 7:
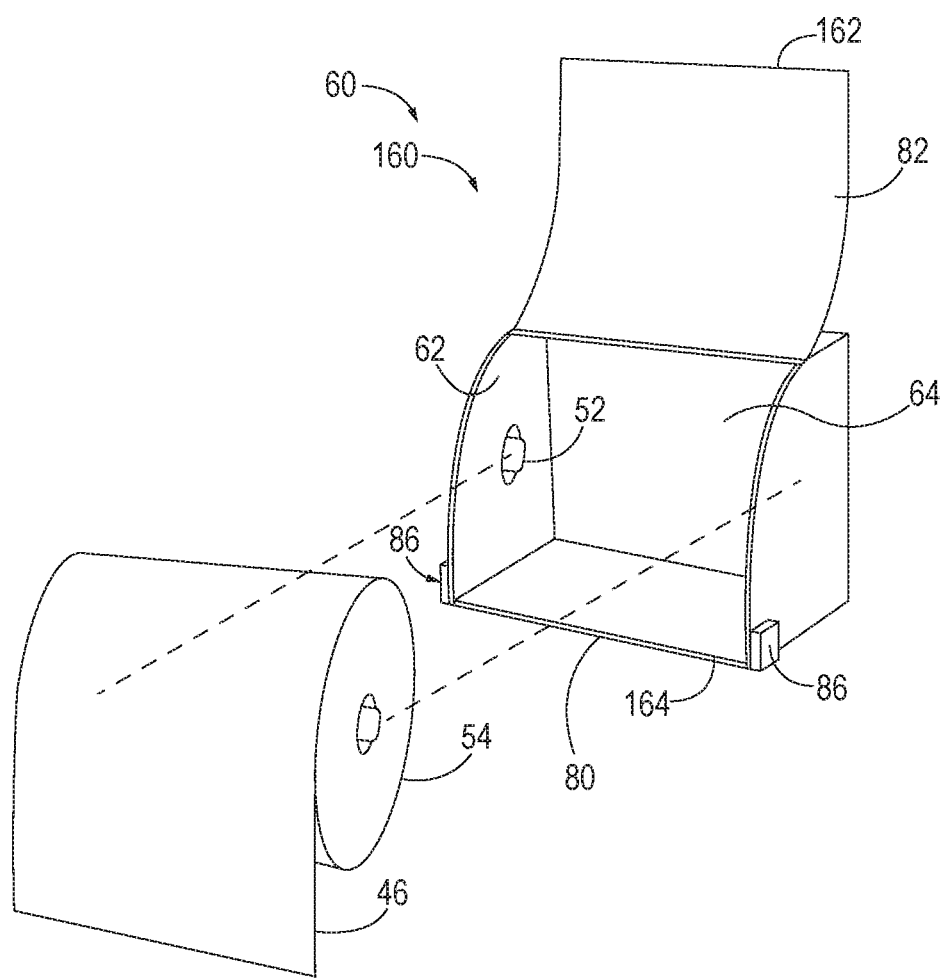
FIG. 7 is an example suppression casing according to the present disclosure, where the suppression casing is in an open state.

As seen in FIGS. 6-7, suppression casing 160 is an example of suppression casing 60. FIG. 6 illustrates example suppression casing 160 in a closed state. Suppression casing 160 includes an access door 82 that is attached to a portion of suppression casing 160 via a suppression attachment mechanism 84. The suppression attachment mechanism 84 is configured to allow the access door 82 to be selectively translated between one or more open states, and a closed state. The suppression casing 160 also includes multiple suppression latch mechanisms 86 that are configured to selectively retain the access door 82 in the closed state. Suppression casing 160 further defines a suppression aperture 80.

FIG. 7 illustrates example suppression casing 160 in an open state. Suppression casing 160 comprises a suppression wall 62 that defines an enclosed storage volume 64. FIG. 7 further illustrates a paper towel holder 52 operationally coupled to the suppression wall 62 and within the enclosed storage volume 64. Suppression casing 160 also includes an access door 82 that is attached to a portion of suppression casing 160 via a suppression attachment mechanism 84 (not pictured in FIG. 7). The suppression attachment mechanism 84 is configured to allow the access door 82 to be selectively translated between one or more open states, and a closed state. Suppression casing 160 further defines a suppression aperture 80 that is configured to allow a portion 46 of paper towel to be dispensed from the enclosed storage volume 64. The suppression aperture 80 defined by suppression casing 160 is defined between an edge 162 of the access door 82 and an edge 164 of the suppression wall 62. Suppression casing 160 also includes multiple suppression latch mechanisms 86 that are configured to selectively retain the access door 82 in the closed state.

Figure 8:
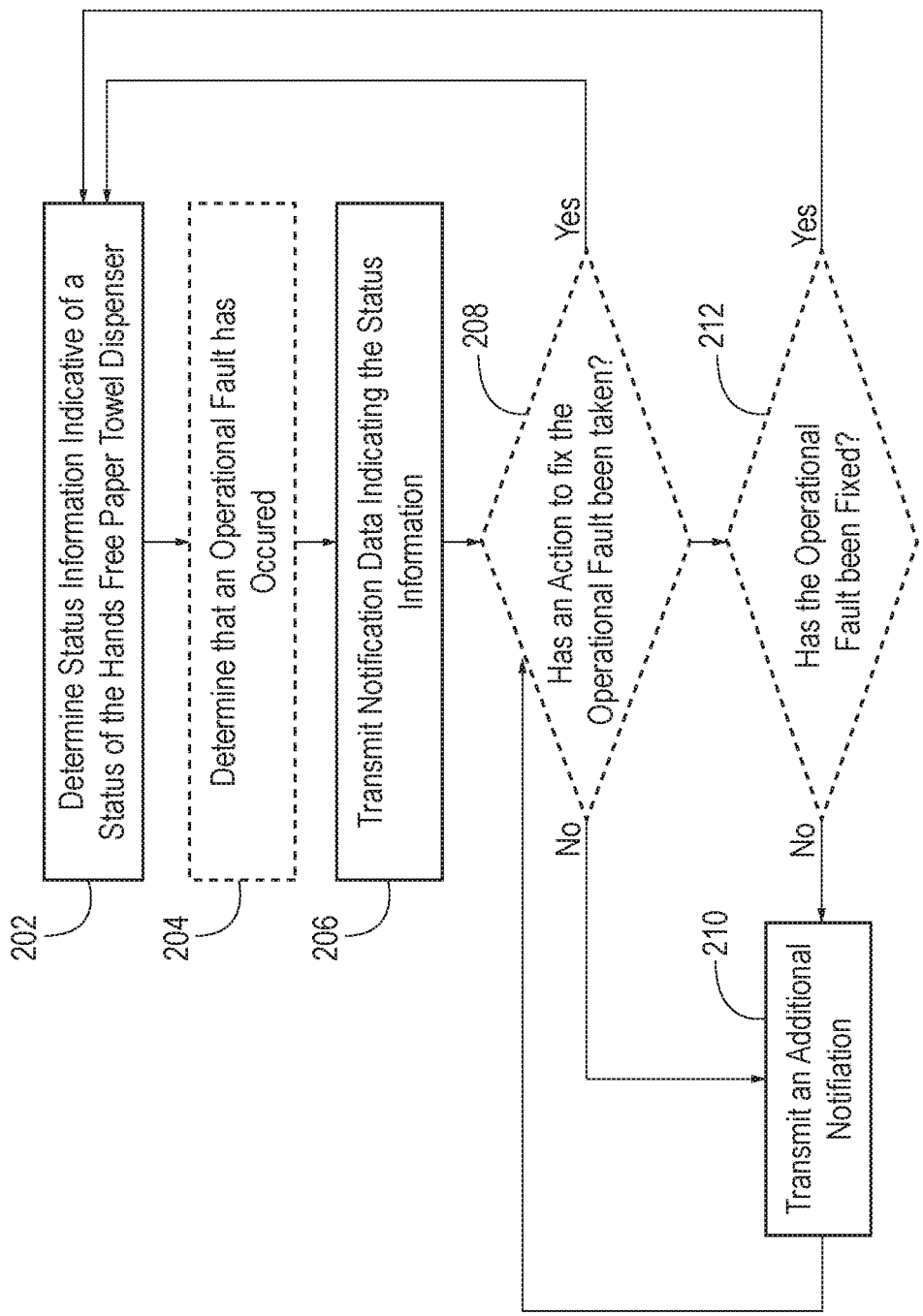
FIG. 8 is a flowchart schematically representing methods for operating a hands free paper towel dispenser according to the present disclosure.

FIG. 8 schematically provides a flowchart that represents illustrative, non-exclusive examples of methods according to the present disclosure. In FIG. 8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 8 are not limiting and other methods and steps are within the scope of the present disclosure, including methods having greater than or fewer than the number of steps illustrated, as understood from the discussions herein.

FIG. 8 illustrates a method 200 for operating a hands free paper towel dispenser for aircraft environments. At operation 202, a hands free paper towel dispenser (e.g., hands free paper towel dispenser 100) determines status information indicative of a status of the hands free paper towel dispenser for aircraft environments. Example sensor information may correspond to a detection of: a paper towel jam; a malfunction of the drive mechanism; a usage of the hands free paper towel dispenser; an amount of the paper towel dispensed; and an amount of the paper towel remaining in the inner volume, etc. The hands free paper towel dispenser may determine the status information based on the sensor information detected by one or more sensors (e.g., sensors 78) incorporated within the hands free paper towel dispenser. For example, individual sensors may be operationally coupled to and/or incorporated within a cabinet housing (e.g., cabinet housing 40), an inner volume (e.g., inner volume 42), a paper towel holder (e.g., paper towel holder 52), a drive mechanism (e.g., drive mechanism 56), or other component elements of the hands free paper towel dispenser. Individual sensors of the one or more sensors may correspond to capacitance sensors, optical sensors, mechanical sensors, ultrasonic sensors, touch sensors, proximity sensors, pressure sensors, microphones, voltage sensors, infrared sensors, tension sensors, piezoelectric sensors, linear encoders, rotary encoders, etc.

At operation 204, the hands free paper towel dispenser optionally determines that an operational fault has occurred. An operational fault may correspond to a low battery, a low paper towel level, a paper jam, and the hands free paper towel dispenser being inoperative. A microprocessor (e.g., microprocessor 72) may determine that the operational fault has occurred based on the status information. Alternatively or in addition, determining the operational fault may correspond to the microprocessor determining that the hands free paper towel dispenser 100 has been tampered with based on the sensor information.

At operation 206, the hands free paper towel dispenser transmits notification data indicating the status information. In some embodiments, the notification data may further indicate that the operational fault has occurred. For example, the hands free paper towel dispenser may include a transmitter (e.g., transmitter 74) configured to transmit the notification data to a computing device (e.g., computing device 76) external to the hands free paper towel dispenser. In various embodiments, the transmitter may be a wireless transmitter, or may be a wired interface configured to transmit the notification data via a physical connection. The computing device may be located on the aircraft that comprises the hands free paper towel dispenser, or may be a ground based system located external to the aircraft that receives the data from the transmitter. Where the computing device is located external to the aircraft, the signal transmitted by the transmitter may be relayed by an intermediary device over a larger network.

At operation 208, the hands free paper towel dispenser determines whether an action to fix the operational fault has occurred. In some embodiments, the hands free paper towel dispenser determines whether a predetermined time period has passed without an action being taken to address the operational fault. If at operation 208 the hands free paper towel dispenser determines that an action has not been taken, method 200 continues at operation 210, where the hands free paper towel dispenser transmits an additional notification. The additional notification may indicate that the operational fault is still present. In various embodiments, the additional notification may be transmitted to the computing device, a different computing device, or both. Once the additional notification is transmitted, method 200 continues at operation 208.

If at operation 208 the hands free paper towel dispenser determines that an action has been taken to fix the operational fault, method 200 continues at operation 212, and the hands free paper towel dispenser determines whether the action taken to repair the operating fault fixed the operational fault. This determination can be made based at least in part on additional status information gathered by the one or more sensors.

If at operation 212 the hands free paper towel dispenser determines that the action taken has not fixed the operational fault, method 200 continues at operation 210, where the hands free paper towel dispenser transmits additional notification data. The additional notification data may indicate that the operational fault is still present. In various embodiments the additional notification data may be transmitted to the computing device, a different computing device, or both. Once the additional notification data is transmitted, method 200 continues at operation 208. If at operation 212 the hands free paper towel dispenser determines that the action taken has fixed the operational fault, method 200 continues at operation 202, and the hands free paper towel dispenser determines new status information indicative of a status of the hands free paper towel dispenser.

Figure 9:
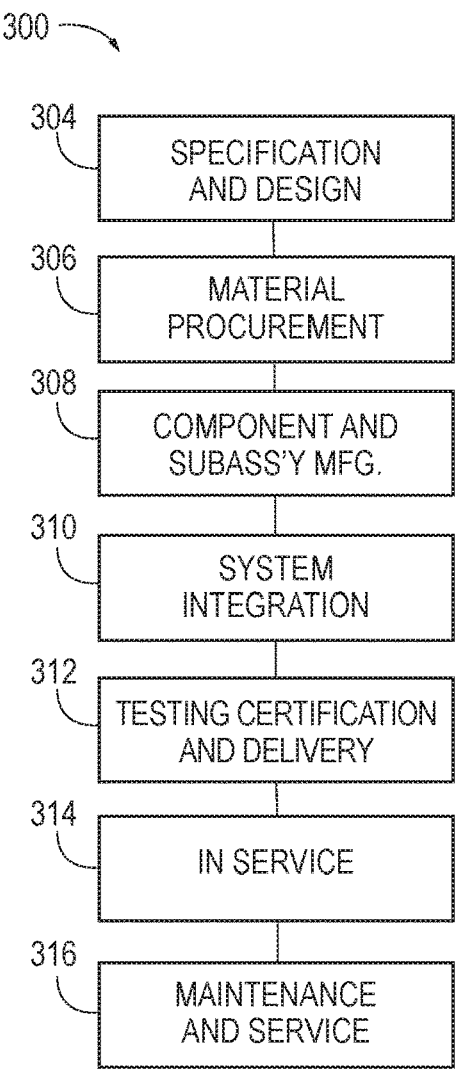
FIG. 9 is a flowchart representing methods for manufacturing an aircraft including a hands free paper towel dispenser according to the present disclosure.
Figure 10:
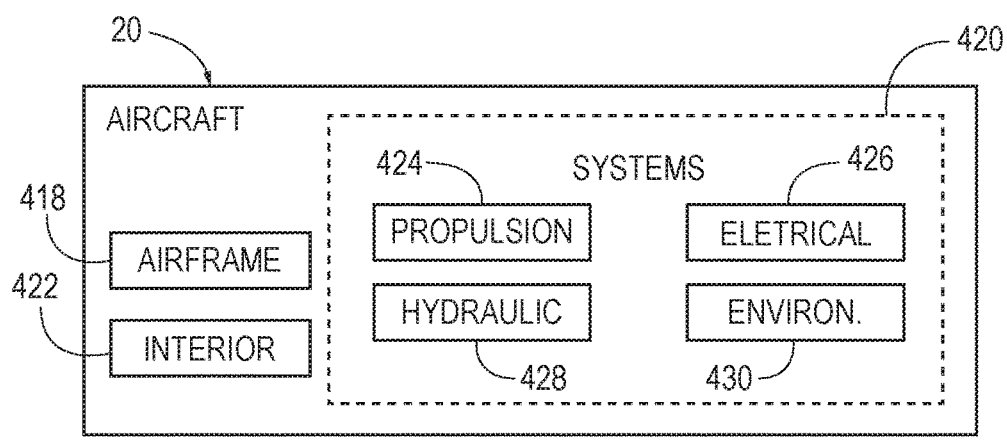
FIG. 10 is a block diagram of an example aircraft including a hands free paper towel dispenser made by the method illustrated in FIG. 9.

Embodiments of the disclosure may be described in the context of an exemplary aircraft production and service method 300 as shown in FIG. 9 and an aircraft 20 as shown in FIGS. 1 and 10. During pre-production, method 300 may include specification and design 304 of the aircraft 20 and material procurement 306. During production, component and subassembly manufacturing 308 and system integration 310 of the aircraft 20 takes place. Thereafter, the aircraft 20 may go through testing certification and delivery 312 in order to be placed in service 314. While in service by a customer, the aircraft 20 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 20 produced by method 300 may include an airframe 418 with a plurality of high-level systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Hands free paper towel dispensers for an aircraft environment and method 200 described herein may be employed during any one or more of the steps of method 300. For example, components or subassemblies corresponding to manufacturing step 308 may be fabricated or manufactured in a manner similar to components or subassemblies produced while the aircraft is in service. Also, one or more hands free paper towel dispensers for an aircraft environments, method 200 embodiments, or a combination thereof may be utilized during manufacturing step 308 and system integration step 310, for example, by substantially expediting assembly of or reducing the cost of an aircraft. Similarly, one or more of hands free paper towel dispensers for an aircraft environments, method 200 embodiments, or a combination thereof may be utilized while the aircraft is in service, for example and without limitation, to maintenance and service step 316.

Additionally or alternatively, the one or more of computing devices may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

Illustrative, non-exclusive examples of inventive subject matter according to the present disclosure are described in the following enumerated paragraphs:

A1. A transportation system, comprising:

a cabinet housing that defines an inner volume and a housing aperture configured to allow a portion of paper towel to be dispensed from the inner volume to a region outside of the cabinet housing wherein the cabinet housing comprises a vanity cover configured to selectively transition between an open state in which the inner volume is accessible, and a closed state in which the inner volume is not accessible;

a paper towel holder within the inner volume and configured to securely retain a supply of paper towel; and a drive mechanism positioned within the inner volume and configured to cause the portion of paper towel to be dispensed from the inner volume to the region outside of the cabinet housing via the housing aperture.

A1.1. The transportation system of paragraph A1, further comprising a suppression casing positioned within the inner volume, and comprising:

a suppression wall defining an enclosed storage volume, wherein the paper towel holder is positioned within the enclosed storage volume; and a suppression aperture defined by the suppression wall and configured to allow the portion of paper towel to be dispensed from within the enclosed storage volume to the drive mechanism, wherein the drive mechanism is located outside of the suppression casing.

A1.1.1. The transportation system of paragraphs A1.1, wherein the suppression casing is configured to securely retain the supply of paper towel to comply with structural requirement specifically and uniquely for aircraft environments.

A1.2. The transportation system of any of paragraphs A1-A1.1.1, wherein the paper towel holder is configured to securely retain the supply of paper towel to comply with structural requirement specifically and uniquely for aircraft environments.

A1.3. The transportation system of any of paragraphs A1-A1.3, wherein the transportation system is one of an aircraft, a train, a maritime vessel, a recreational vehicle, and an automobile.

A2. The transportation system of any of paragraphs A1-A1.3, wherein the drive mechanism is configured to automatically dispense the portion of paper towel.

A2.1. The transportation system of any of paragraphs A1-A2, wherein the drive mechanism is composed of a low flammability material.

A2.1.1. The transportation system of paragraph A2.1, wherein the drive mechanism is composed of one or more materials that comply with stringent flammability requirements specifically and uniquely for aircraft environments.

A3. The transportation system of any of paragraphs A1-A2.1.1, further comprising a motor configured to drive the drive mechanism.

A3.1. The transportation system of paragraph A3, further comprising a power source configured to drive the motor.

A3.1.1. The transportation system of paragraph A3.1, wherein the power source comprises a battery.

A3.1.2. The transportation system of paragraph A3.1.1, wherein the power source comprises a connection to an electrical system of the transportation system.

A4. The transportation system of any of paragraphs A1.1-A3.1.2, wherein the suppression wall includes an access door configured to selectively transition between an open state in which the supply of paper towel can be refilled or removed from the paper towel holder, and a closed state in which the supply of paper towel is secured within the enclosed storage volume.

A4.1. The transportation system of paragraph A4, wherein the access door includes a latch configured to selectively retain the access door in the closed state.

A4.1.1. The transportation system of paragraphs A4.1, wherein the latch is configured to securely retain the access door so as to secure the supply of paper towel to comply with structural requirement specifically and uniquely for aircraft environments.

A5. The transportation system of any of paragraphs A1.1-A4.1, wherein the suppression wall is partially or completely composed of a low flammability material.

A5.1. The transportation system of paragraph A5, wherein the suppression wall is composed of one or more materials that comply with stringent flammability requirements specifically and uniquely for aircraft environments.

A6. The transportation system of any of paragraphs A1.1-A5.1, wherein the suppression wall is configured to limit a flow of air into the enclosed storage volume.

A6.1. The transportation system of paragraph A6, wherein the suppression wall is configured so that air is only allowed into the enclosed storage volume via the suppression aperture.

A7. The transportation system of any of paragraphs A1.1-A6, wherein the suppression aperture is shaped to allow the portion of paper towel to be dispensed from within the enclosed storage volume while limiting the flow of air into the enclosed storage volume.

A7.1. The transportation system of paragraph A7, wherein the suppression aperture is shaped so that the flow of air into the enclosed storage volume via the suppression aperture is insufficient to deliver oxygen to sustain a flame within the enclosed storage volume.

A8. The transportation system of any of paragraphs A8-A7, wherein limiting the flow of air into the enclosed storage volume is configured to cause an ignited portion of paper towel within the enclosed storage volume to be extinguished due to lack of oxygen.

A9. The transportation system of any of paragraphs A1-A8, wherein the cabinet housing is operatively coupled to a frame of the transportation system.

A9.1. The transportation system of paragraph A9, wherein the cabinet housing is operatively coupled to a frame of a wall of the lavatory of the transportation system.

A10. The transportation system of any of paragraphs A1.1-A9.1, wherein the suppression wall is directly coupled to the frame of a wall of the lavatory of the transportation system.

A11. The transportation system of any of paragraphs A1-A10, wherein the transportation system further comprises a hand sensor.

A11.1. The transportation system of paragraph A11, wherein the drive mechanism is configured to dispense the portion of paper towel in response to sensor data from the hand sensor.

A12. The transportation system of any of paragraphs A1-A11.1, wherein the transportation system further comprises a sensor that is configured to detect that the portion of paper towel has been removed.

A13. The transportation system of any of paragraphs A1-A12, wherein the drive mechanism is configured to dispense an additional portion of paper towel after a predetermined period of time has passed after the portion of paper towel is removed.

A14. The transportation system of any of paragraphs A1-A13, wherein the vanity cover includes a mirror.

A15. The transportation system of any of paragraphs A1-A14, wherein the vanity cover includes shelving configured to store one or more objects.

A16. The transportation system of any of paragraphs A1-A15, wherein the vanity cover is at least a portion of a lavatory vanity of the transportation system.

A17. The transportation system of any of paragraphs A1-A16, wherein the vanity cover includes a vanity latch to selectively retain the vanity cover in the closed state.

A17.1. The transportation system of paragraph A17, wherein the vanity latch is configured to securely retain the access door so as to secure the supply of paper towel to comply with structural requirement specifically and uniquely for aircraft environments.

A18. The transportation system of any of paragraphs A1-A17.1, further comprising a microprocessor configured to determine status information indicative of a status of a hands free paper towel dispenser in the transportation system, and a transmitter configured to transmit data describing the status information to a computing device external to the hands free paper towel dispenser.

A18.1. The transportation system of paragraph A18, wherein the transmitter is a wireless transmitter.

A18.2. The transportation system of any of paragraphs A18-A18.1, wherein the computing device is located on the aircraft.

A18.3. The transportation system of any of paragraphs A18-A18.1, wherein the computing device is a ground based system external to the transportation system.

A18.4. The transportation system of any of paragraphs A18-A18.3, wherein the transportation system further includes one or more sensors configured to detect sensor information relating to the status of the hands free paper towel dispenser in the transportation system.

A18.4.1. The transportation system of paragraph A18.4, wherein the microprocessor determines the status information based on the sensor information.

A18.4.2. The transportation system of any of paragraphs A18.4-A18.4.1, wherein the one or more sensors are configured to detect at least one of a paper towel jam, a malfunction of the drive mechanism, a usage of the hands free paper towel dispenser, an amount of the supply of paper towel dispensed, and an amount of the supply of paper towel remaining in the enclosed volume.

A18.4.3. The transportation system of any of paragraphs A18.4-A18.4.2, wherein the one or more sensors are configured to detect that the hands free paper towel dispenser has been tampered with based on the sensor information.

A18.5. The transportation system of any of paragraphs A18-A18.4.3, wherein the microprocessor is configured to determine based on the status information that an operational fault of the hand free paper towel dispenser has occurred.

A18.5.1. The transportation system of paragraph A18.5, wherein the operational fault corresponds to one of a low battery, a low paper towel level, a paper jam, and a hands free paper towel dispenser being inoperative.

A18.5.2. The transportation system of any of paragraphs A18.5-A18.5.1, wherein responsive to the microprocessor determining that the operational fault has occurred, the microprocessor is further configured to cause the transmitter to transmit a notification to the computing device that the operational fault has occurred.

A18.5.2.1. The transportation system of paragraph A18.5.2, wherein the microprocessor is further configured to determine that, after the notification is transmitted, an action has not been taken to address the operational fault and cause the transmitter to transmit an additional notification to an additional computing device that the operational fault has occurred.

A18.5.2.1.1. The transportation system of paragraph A18.5.2.1, wherein the additional computing device is external to the transportation system.

A18.5.2.2. The transportation system of any of paragraphs A18.5.2, wherein the microprocessor is further configured to: determine that, after the notification is transmitted, an action has been taken to address the operational fault, determine that the operational fault is still present after the action has been taken, and cause the transmitter to transmit an additional notification to the computing device that the operational fault is still present.

A18.5.2.3. The transportation system of paragraph A18.5.2, wherein the microprocessor is further configured to: determine that a predetermined time period has passed without an action being taken to address the operational fault, and cause the transmitter to transmit an additional notification to the computing device that the operational fault is still present.

A19. The transportation system of any of paragraphs A1.1-A18.5.2.3, further comprising an additional suppression casing comprising:

an additional suppression wall defining an additional enclosed storage volume;

an additional paper towel holder coupled to the additional suppression wall and configured to securely retain an additional supply of paper towel; and an additional suppression aperture defined by the suppression wall and configured to allow the additional portion of paper towel to be dispensed from within the additional enclosed storage volume and to the drive mechanism.

A19.1. The transportation system of paragraph A19, wherein when the vanity cover is in the open state the additional suppression casing is accessible.

A19.2. The transportation system of any of paragraphs A19-A19.1, wherein when the vanity cover is in the closed state the additional suppression casing is obscured from view by the vanity cover.

A20. The transportation system of any of paragraphs A1-A19.2, wherein the suppression casing further comprises an additional paper towel holder coupled to the suppression wall and configured to securely retain the additional supply of paper towel within the enclosed volume.

A20.1. The transportation system of paragraph A20, wherein the suppression casing further comprises an additional suppression aperture defined by the suppression wall and configured to allow the additional portion of paper towel to be dispensed from within the enclosed storage volume to the drive mechanism.

A22. The transportation system of any of paragraphs A1-A20.1, wherein the paper towel held by the paper towel holder comprises a paper towel roll.

B1. A method for operating a hands free paper towel dispenser in a transportation system, the method comprising:

determining, by a microprocessor of the hands free paper towel dispenser, a status information indicative of a status of the hands free paper towel dispenser, wherein the status of the hands free paper towel dispenser comprises one of a paper towel jam, a malfunction of the drive mechanism, a usage of the hands free paper towel dispenser, an amount of the paper towel dispensed, and an amount of the paper towel remaining in the enclosed volume; and transmitting notification data indicating the status information to a computing device external to the hands free paper towel dispenser.

B2. The method of paragraphs B1, wherein determining the status information comprises determining that an operational fault of the hands free paper towel dispenser has occurred, and the notification data indicates the operational fault.

B2.1. The method of paragraphs B2, further comprising:

determining that, after the notification data is transmitted, an action to address the operational fault has not been taken; and causing the transmitter to transmit an additional notification to an additional computing device that the operational fault of the hands free paper towel dispenser has occurred.

B2.2. The method of any of paragraphs B2-B2.1, further comprising:

determining that, after the notification data is transmitted, an action has been taken to address the operational fault;

determining that an operational fault is still present after the action has been taken; and causing the transmitter to transmit an additional notification to the computing device that the operational fault is still present.

B2.3. The method of any of paragraphs B2-B2.2, further comprising:

determining that a predetermined time period has passed without an action being taken to address the operational fault; and causing the transmitter to transmit an additional notification to the computing device that the operational fault is still present.

B3. The method of any of paragraphs B1-B2.3, performed by the transportation system of paragraphs A1-A21.

C1. Use of the transportation system of any of paragraphs A1-A21.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A transportation system, comprising:
a cabinet housing that defines an inner volume and a housing aperture configured to allow a portion of paper towel to be dispensed from the inner volume to a region outside of the cabinet housing, wherein the cabinet housing comprises a vanity cover configured to selectively transition between an open state in which the inner volume is accessible, and a closed state in which the inner volume is not accessible;
a paper towel holder within the inner volume and configured to securely retain a supply of paper towel;
a drive mechanism positioned within the inner volume and configured to cause the portion of paper towel to be dispensed from the inner volume to the region outside of the cabinet housing via the housing aperture; and
a suppression casing positioned within the inner volume, wherein the suppression casing comprises:
a suppression wall defining an enclosed storage volume, wherein the paper towel holder is positioned within the enclosed storage volume, and wherein the suppression wall comprises an access door configured to selectively transition between an open state in which the supply of paper towel can be refilled or removed from the paper towel holder and a closed state in which the supply of paper towel is secured within the enclosed storage volume; and
a suppression aperture defined by the suppression wall and configured to allow the portion of paper towel to be dispensed from within the enclosed storage volume to the drive mechanism, wherein the drive mechanism is located outside of the suppression casing.

2. The transportation system of claim 1, wherein the suppression aperture is shaped to allow the portion of paper towel to be dispensed from within the enclosed storage volume while limiting a flow of air into the enclosed storage volume such that the flow of air into the enclosed storage volume via the suppression aperture is insufficient to deliver oxygen to sustain a flame within the enclosed storage volume.

3. The transportation system of claim 1, further comprising:
a microprocessor configured to:
determine status information indicative of a status of the transportation system; and
determine based on the status information that an operational fault of a hands free paper towel dispenser has occurred; and
a transmitter configured to transmit data describing the status information to a computing device external to the transportation system.

4. The transportation system of claim 3, wherein responsive to the microprocessor determining that the operational fault has occurred, the microprocessor is further configured to cause the transmitter to transmit a notification to the computing device external from the hands free paper towel dispenser that the operational fault has occurred.

5. The transportation system of claim 4, wherein the microprocessor is further configured to:
determine that, after the notification is transmitted, an action has not been taken to address the operational fault; and
cause the transmitter to transmit an additional notification to an additional computing device that the operational fault has occurred.

6. The transportation system of claim 4, wherein the microprocessor is further configured to:
  determine that, after the notification is transmitted, an action has been taken to address the operational fault; and
  determine that the operational fault is still present after the action has been taken, and cause the transmitter to transmit an additional notification to the computing device that the operational fault is still present.

7. The transportation system of claim 4, wherein the microprocessor is further configured to:
  determine that a predetermined time period has passed without an action being taken to address the operational fault; and
  cause the transmitter to transmit an additional notification to the computing device that the operational fault is still present.

8. The transportation system of claim 1, wherein the vanity cover is a substantially planar vertical surface, and wherein the vanity cover is substantially coplanar with at least one of an additional surface of the cabinet housing, and a wall of the transportation system.

9. The transportation system of claim 1, wherein the vanity cover includes at least one of a mirror and one or more shelves configured to store one or more objects.

10. The transportation system of claim 1, wherein the cabinet housing is operatively coupled to a frame of the transportation system.

11. The transportation system of claim 1, further comprising an additional suppression casing comprising:
  an additional suppression wall defining an additional enclosed storage volume;
  an additional paper towel holder coupled to the additional suppression wall and configured to securely retain an additional supply of paper towel; and
  an additional suppression aperture defined by the suppression wall and configured to allow an additional portion of paper towel to be dispensed from within the additional enclosed storage volume to the drive mechanism.

12. The transportation system of claim 1, further comprising an additional paper towel holder coupled to the suppression wall of the suppression casing and configured to securely retain an additional supply of paper towel within the enclosed storage volume.

13. The transportation system of claim 1, wherein the suppression casing further comprises an additional suppression aperture defined by the suppression wall and configured to allow an additional portion of paper towel to be dispensed from within the enclosed storage volume to the drive mechanism.

14. The transportation system of claim 1, wherein the transportation system is an aircraft and further comprises a fuselage and wings attached to the fuselage; and wherein the cabinet housing is mounted within the fuselage.

15. A transportation system, comprising:
  a cabinet housing that defines an inner volume and a housing aperture configured to allow a portion of paper towel to be dispensed from the inner volume to a region outside of the cabinet housing, wherein the cabinet housing comprises a vanity cover configured to selectively transition between an open state in which the inner volume is accessible, and a closed state in which the inner volume is not accessible;
  a first paper towel holder within the inner volume and configured to securely retain a first supply of paper towel;
  a second paper towel holder within the inner volume and configured to securely retain a second supply of paper towel;
  a drive mechanism positioned within the inner volume and configured to cause the portion of paper towel to be dispensed from the inner volume to the region outside of the cabinet housing via the housing aperture;
  a first suppression casing positioned within the inner volume, wherein the first suppression casing comprises:
    a first suppression wall defining a first enclosed storage volume, wherein the first paper towel holder is positioned within the first enclosed storage volume; and
    a first suppression aperture defined by the first suppression wall and configured to allow a portion of the first supply of paper towel to be dispensed from within the first enclosed storage volume to the drive mechanism, wherein the drive mechanism is located outside of the first suppression casing; and
  a second suppression casing positioned within the inner volume, wherein the second suppression casing comprises:
    a second suppression wall defining a second enclosed storage volume, wherein the second paper towel holder is positioned within the second enclosed storage volume; and
    a second suppression aperture defined by the second suppression wall and configured to allow a portion of the second supply of paper towel to be dispensed from within the second enclosed storage volume to the drive mechanism, wherein the drive mechanism is located outside of the second suppression casing.

16. The transportation system of claim 15,
  wherein the first suppression wall comprises a first access door configured to selectively transition between an open state in which the first supply of paper towel can be refilled or removed from the first paper towel holder and a closed state in which the first supply of paper towel is secured within the first enclosed storage volume; and
  wherein the second suppression wall comprises a second access door configured to selectively transition between an open state in which the second supply of paper towel can be refilled or removed from the second paper towel holder and a closed state in which the second supply of paper towel is secured within the second enclosed storage volume.

17. The transportation system of claim 15,
  wherein the first suppression aperture is shaped to allow the portion of the first supply of paper towel to be dispensed from within the first enclosed storage volume while limiting a first flow of air into the first enclosed storage volume such that the first flow of air into the first enclosed storage volume via the first suppression aperture is insufficient to deliver oxygen to sustain a first flame within the first enclosed storage volume; and
  wherein the second suppression aperture is shaped to allow the portion of the second supply of paper towel to be dispensed from within the second enclosed storage volume while limiting a second flow of air into the second enclosed storage volume such that the second flow of air into the second enclosed storage volume via the second suppression aperture is insufficient to deliver oxygen to sustain a second flame within the second enclosed storage volume.

18. A transportation system, comprising:
a cabinet housing that defines an inner volume and a housing aperture configured to allow a portion of paper towel to be dispensed from the inner volume to a region outside of the cabinet housing, wherein the cabinet housing comprises a vanity cover configured to selectively transition between an open state in which the inner volume is accessible, and a closed state in which the inner volume is not accessible;
a paper towel holder within the inner volume and configured to securely retain a supply of paper towel;
a drive mechanism positioned within the inner volume and configured to cause the portion of paper towel to be dispensed from the inner volume to the region outside of the cabinet housing via the housing aperture; and
a suppression casing positioned within the inner volume, wherein the suppression casing comprises:
 a suppression wall defining an enclosed storage volume, wherein the paper towel holder is positioned within the enclosed storage volume;
 a first suppression aperture defined by the suppression wall and configured to allow the portion of paper towel to be dispensed from within the enclosed storage volume to the drive mechanism, wherein the drive mechanism is located outside of the suppression casing; and
 a second suppression aperture defined by the suppression wall and configured to allow an additional portion of paper towel to be dispensed from within the enclosed storage volume to the drive mechanism.

19. The transportation system of claim 18, wherein the suppression wall comprises an access door configured to selectively transition between an open state in which the supply of paper towel can be refilled or removed from the paper towel holder and a closed state in which the supply of paper towel is secured within the enclosed storage volume.

20. The transportation system of claim 18,
wherein the first suppression aperture is shaped to allow the portion of paper towel to be dispensed from within the enclosed storage volume while limiting a first flow of air into the enclosed storage volume such that the first flow of air into the enclosed storage volume via the first suppression aperture is insufficient to deliver oxygen to sustain a first flame within the enclosed storage volume; and
wherein the second suppression aperture is shaped to allow the additional portion of paper towel to be dispensed from within the enclosed storage volume while limiting a second flow of air into the enclosed storage volume such that the second flow of air into the enclosed storage volume via the second suppression aperture is insufficient to deliver oxygen to sustain a second flame within the enclosed storage volume.

* * * * *